United States Patent [19]

Bennett et al.

[11] Patent Number: 5,353,393
[45] Date of Patent: Oct. 4, 1994

[54] APPARATUS AND METHOD FOR MANIPULATING SCANNED DOCUMENTS IN A COMPUTER AIDED DESIGN SYSTEM

[75] Inventors: Paul M. Bennett, Highlands Ranch, Colo.; William A. Opincar; Wylie W. McDonald, both of Plano, Tex.

[73] Assignee: Sunwest Trading Corporation, Dallas, Tex.

[21] Appl. No.: 984,009

[22] Filed: Nov. 30, 1992

Related U.S. Application Data

[63] Continuation of Ser. No. 782,876, Oct. 17, 1991, abandoned, which is a continuation of Ser. No. 366,665, Jun. 14, 1989, abandoned.

[51] Int. Cl.$^5$ ............................................. G06F 15/70
[52] U.S. Cl. ..................................................... 395/135
[58] Field of Search ............... 340/734, 747, 750, 721; 382/45; 395/133, 135, 141, 143; 345/135, 16, 17

[56] References Cited

U.S. PATENT DOCUMENTS

| | | | |
|---|---|---|---|
| 4,811,243 | 3/1989 | Racine | 364/520 |
| 4,823,281 | 4/1989 | Evangelisti et al. | 364/518 |
| 4,843,569 | 6/1989 | Sawada et al. | 364/518 |
| 4,849,911 | 7/1989 | Campian | 364/521 |
| 4,905,185 | 2/1990 | Sakai | 364/900 |
| 4,914,607 | 4/1990 | Takanashi et al. | 364/521 |
| 4,933,878 | 6/1990 | Guttag et al. | 364/521 |
| 5,022,085 | 6/1991 | Cok | 382/1 |
| 5,034,901 | 7/1991 | Kuwata et al. | 364/518 |
| 5,060,171 | 10/1991 | Stein et al. | 364/521 |
| 5,067,087 | 11/1991 | Seki et al. | 364/474.24 |
| 5,125,074 | 6/1992 | Labeaute et al. | 395/121 |

OTHER PUBLICATIONS

Sippl, Computer Dictionary, 1986, pp. 393, 545.
Goodman, The Complete Hypercard Handbook, 1987, pp. 70, 194–195, 221, 271.
Medland et al., CAP/CAM in Practice, 1986, pp. 17–30, 72–74, 106.
McIntosh, "HyperCard User's Guide", 1988, pp. 124–150.
ESRI "ARC/INFO Image Integrator", 1990.
Arc News "Integration of Geographic Inf. Technologies" Winter 1989, vol. 11, No. 1.

*Primary Examiner*—Phu K. Nguyen
*Attorney, Agent, or Firm*—Lowe, Price, LeBlanc & Becker

[57] ABSTRACT

An apparatus and method for manipulating scanned documents using computer aided design (CAD) commands includes a link program which receives the CAD commands and displays all or selected portions of a raster-based image, which is created by scanning a hard copy document. The link program will display the portion of the raster image which fits within a predetermined CAD window and will scale the raster image up or down as necessary to fit within the display window. The raster image is displayed on a computer screen and provides a useful reference for an operator to create a CAD image which is a duplicate of the raster image by tracing directly over the raster image or, alternatively, to implement desired changes in the raster image using CAD commands. An edit program merges the CAD image and the original raster image to create a new, updated raster image, which includes all CAD-generated changes made by the operator. The updated raster image can be reproduced in hard copy form by a raster plotter.

42 Claims, 9 Drawing Sheets

APPARATUS AND METHOD FOR MANIPULATING SCANNED DOCUMENTS IN A COMPUTER AIDED DESIGN SYSTEM

This application is a continuation of application Ser. No. 07/782,876 filed Oct. 17, 1991, now abandoned, which is a continuation of Ser. No. 07/366,665 filed Jun. 14, 1989, now abandoned.

FIELD OF THE INVENTION

This invention relates to computer aided design systems and in particular to an apparatus and method for manipulating scanned documents in an existing computer aided design system.

BACKGROUND OF THE INVENTION

Computer aided design (CAD) packages are commonly used to create and edit drawings and other graphic displays on a computer screen or other cathode ray tube (CRT) display. CAD systems are particularly well-suited for producing engineering design drawings by allowing the user to enter a series of commands to produce certain standard elements of the drawing, such as circles, squares and lines, at selected locations on screen to effect a particular design. A locator device such as a pointer, cursor, "mouse" or cross-hair, is used to select the position on the screen at which a particular element is to be drawn. Changes to the drawing can be made directly on screen. The display scale can be changed to zoom in on selected portions of the drawing.

DESCRIPTION OF THE PRIOR ART

According to prior practice, drawings may be created "from scratch" using the CAD system or, alternatively, a hard copy drawing may be reproduced on screen by entering the proper sequence of drawing commands into the CAD system. Reproduction of a hard copy drawing on screen using the CAD system is a tedious, time consuming process, which requires the operator to match up the various features of the hard copy drawing with their respective locations on screen and to enter the proper commands into the CAD system to create the image.

It is also known in the art to scan a hard copy document to produce a raster image, which is stored in the system memory as a plurality of data bits corresponding to the number of picture elements (pixels) comprising the raster image. The raster image is then converted into a vector-based image which is compatible with the CAD system. The vector-based image can be displayed on screen, changed and otherwise manipulated using CAD commands.

One problem associated with the aforementioned technique of converting the raster image to a vector-based image is that the lengths of the pixels in the raster image are changed to equivalent horizontal vectors. As a result, resolution problems may occur, especially when the image is zoomed in to display small portions thereof, because the vector-image degrades into short horizontal or vertical lines on the screen.

Another technique involves converting groups of pixels into CAD commands corresponding to selected features of the drawings, such as circles, squares and lines, using artificial intelligence. One problem associated with this technique is that recognition errors often occur, which necessitate manual "clean-up" of the drawing by a skilled operator.

OBJECTS OF THE INVENTION

It is, therefore, the principal object of the present invention to provide an improved apparatus and method for manipulating scanned documents using computer aided design commands.

It is another object of the invention to provide an apparatus and method for facilitating the reproduction of hard copy documents with a computer aided design system.

It is still another object of the invention to provide an apparatus and method for facilitating the editing of documents on a computer screen using standard computer aided design commands.

It is yet another object of the invention to provide an apparatus and method for producing a raster image output from a standard computer aided design system.

SUMMARY OF THE INVENTION

These and other objects are accomplished in accordance with the present invention wherein apparatus and method for manipulating a scanned document in an electronic data processing system includes means for electronically displaying a first image representing the scanned document and for displaying a second image in response to user input commands superimposed on the first image. In one aspect of the invention the scanned document is represented by a first digital coded image, which includes a first plurality of image elements, each of which has a defined position relative to a predetermined reference position. A second digital coded image representing the user input commands is also generated, which includes a second plurality of image elements, each of which has a defined position relative to the predetermined reference position. The first digital coded image is electronically displayed as the first image and the second digital coded image is electronically displayed as the second image superimposed on the first image. The first image is maintained substantially in registration with the second image.

In another embodiment means responsive to a command indicating that only a selected portion of the scanned document is to be displayed is provided for manipulating the first image to display only the selected portion of the scanned document. In yet another embodiment, the means for displaying only the selected portion of the first image includes means for determining the location and boundaries of a substantially rectangular window representing the selected portion of the scanned document which is to be displayed as the first image; means for identifying the particular ones of the first plurality of image elements which fall within the boundaries of the display window; and means for adjusting the scale of the first image to conform to the display window.

In the preferred embodiment the first image is a raster image and the first plurality of image elements are a corresponding plurality of picture elements, each of which is in either an on or an off state. Each element which is in an on state has a first color associated therewith and each element which is in an off state has a second color associated therewith, which is different from the first color. The second image is a vector image comprised of a plurality of vectors, certain ones of which have defined starting and ending positions with respect to the predetermined reference position and others of which represent corresponding predetermined shapes at respective positions with respect to the predetermined reference position. Each vector typically has a predetermined color associated therewith.

In another aspect of the invention, the second image represents changes which the user desires to implement in the first image and means are provided for editing the first image to incorporate the second image. In one embodiment the first image is displayed in first and second colors, the second color being different from the first color. The second image is displayed in at least one color. The first image is edited so that a first portion thereof which is displayed in the first color and is overlaid by a corresponding first portion of the second image, which is displayed in the second color, is erased and a second portion of the second image, which overlays a corresponding second portion of the first image and is displayed in a color other than the second color, is incorporated into the first image to change the second portion of the first image. A third portion of the first image which is not overlaid by any portion of the second image remains unchanged.

In the preferred embodiment, the first image is a raster image, which includes a plurality of picture elements, each of which is either in an on or an off state. Each element which is in an on state is displayed in the first color and each element which is in an off state is displayed in the second color. Each of the picture elements has a defined position with respect to a predetermined reference position. The second image is a vector image, which includes a plurality of vectors, each of which is displayed in a predetermined color. The editing means includes means for identifying a first set of picture elements comprising the first portion of the first image and for changing said first set of picture elements from an on state to an off state and for identifying a second set of picture elements comprising the second portion of the first image and changing the second set of picture elements from an off state to an on state. The first color preferably represents the foreground color of the raster image and the second color represents the background color of the raster image.

BRIEF DESCRIPTION OF THE DRAWINGS

Further objects and advantages of the invention will be apparent from the Detailed Description and Claims when read in conjunction with the accompanying drawings wherein:

DETAILED DESCRIPTION OF THE PREFERRED EMBODIMENT

Figures 1, 2A:
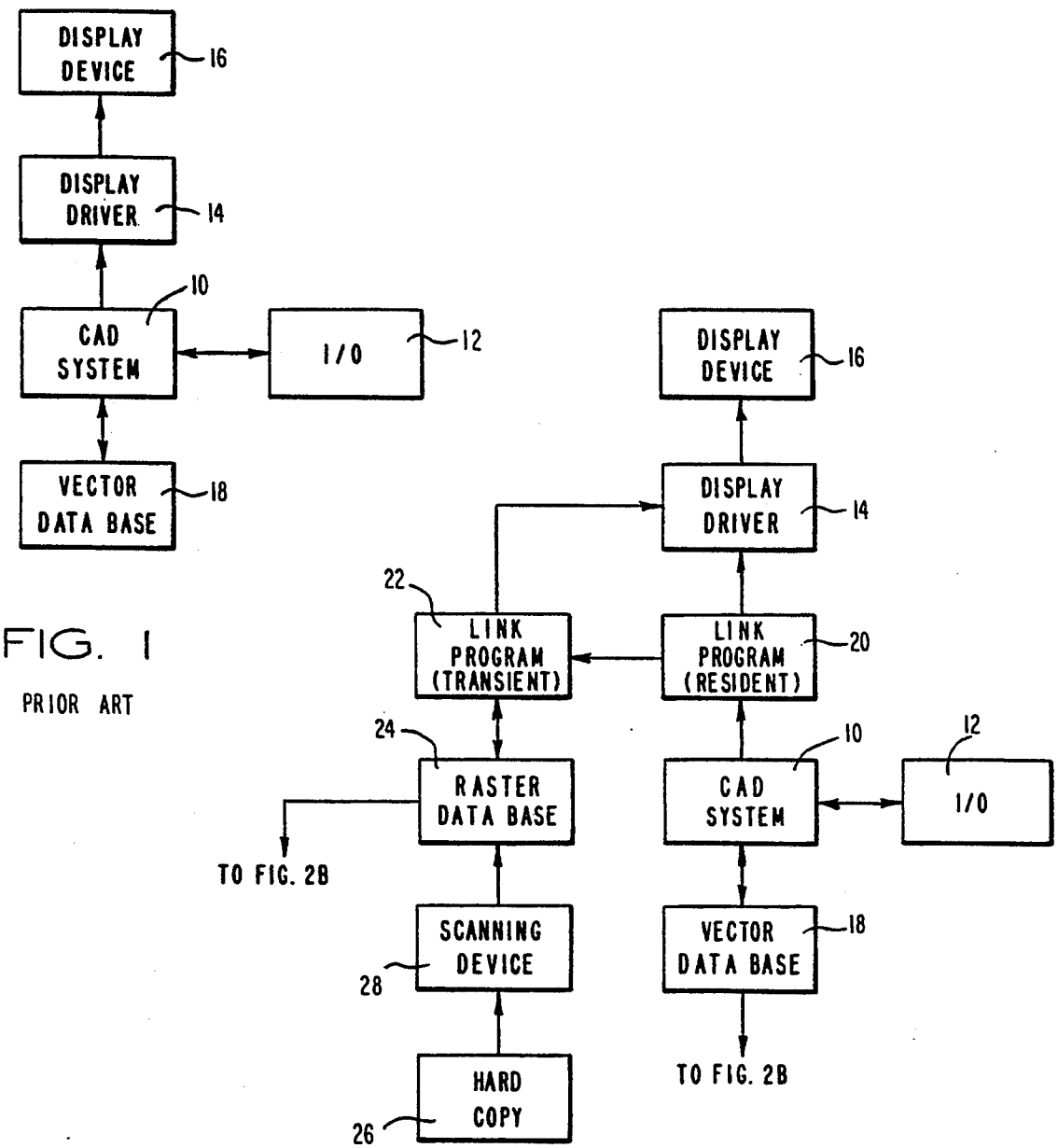
FIG. 1 is a functional block diagram of a typical computer aided design system.
FIGS. 2A and 2B are functional block diagrams illustrating the apparatus and method for manipulating scanned documents using computer aided design commands, according to the present invention.

In the description which follows like parts are marked throughout the specification and drawings, respectively. The drawings are not necessarily to scale and in some instances proportions have been exaggerated in order to more clearly depict certain features of the invention. Referring to FIG. 1, a conventional computer aided design (CAD) system 10 receives user inputs via an input/output (I/O) device 12 (which may include a key board) and translates the inputs into selected commands to control a software-implemented display driver 14, which in turn controls a hardware display device 16. The CAD commands are used to produce a design drawing or the like on a computer screen display. The user manipulates a locator device, such as a pointer, cursor, or "mouse", to select the location on the screen at which a particular drawing feature is to be displayed.

For example, the user can control CAD system 10 to produce a circle, square, line or other standard drawing feature, at a particular position on the display by positioning the locator device at the selected position on the display and entering the appropriate command. CAD system 10 will respond to the user input by controlling display driver 14 and display device 16 to produce the selected drawing feature at the selected location on the screen display. The user inputs corresponding to the desired drawing features are stored in a vector database 18 where the design features are represented by a plurality of discrete vectors, selected ones of which have starting and ending point coordinates with reference to a predetermined origin.

Other ones of the vectors may represent a predetermined geometric shape, such as a circle, at a predetermined position relative to a defined reference position. Using CAD system 10, a user can construct detailed design drawings and edit the drawings as necessary directly on screen. The drawing is stored in digital code form in vector database 18 and can be printed out in hard copy form on an output device, such as a plotter. The display color, origin point and scale can be selected by the user.

Referring to FIG. 2A, in accordance with the present invention, a link program is interposed between CAD system 10 and display driver 14 to intercept CAD commands and interpret such commands to manipulate a scanned document in response thereto. The scanned document is stored in memory in digital code form, which represents a raster image of the document. The link program includes a resident link program 20, which interprets the CAD commands, and a transient link program 22, which retrieves the raster image from a raster database 24. The raster image is entered into raster database 24 by optically scanning a hard copy raster image 26 using a conventional scanning device 28, such as an optical image reader.

Resident link program 20 serves as a terminate and stay resident (TSR) program to monitor the CAD commands flowing between CAD system 10 and display driver 14. Upon intercepting a "CLEAR SCREEN" or similar command, resident link program 20 loads transient link program 22, which performs the actual manipulation of the displayed raster image in accordance with the CAD commands. Transient link program 22 also determines the origin and coordinates of the predetermined CAD window by communicating with CAD system 10. The size and location coordinates of the window determine whether all or a particular portion of the raster image is to be displayed.

The raster image is different from the vector-based image in that the raster image is stored in the system memory by a predetermined bit map corresponding to the number of picture elements (pixels) which can be displayed by display device 16. Each screen display typically has associated therewith a predetermined number of pixels along a horizontal axis and a predetermined number of pixels along a vertical axis. The number of pixels along the vertical axis may be different from the number of pixels along the horizontal axis. Each screen pixel is assigned a particular location in memory and has a particular code associated therewith, which may indicate that the corresponding caster pixel is "off" and therefore appears in the background color (e.g., white) or that the corresponding pixel is "on" and therefore appears in the foreground color (e.g., black) of the display. Each pixel represents a predetermined position or "dot" on the display and is typically rectangular shaped.

It is important that the raster image be maintained in the proper registration on the display screen with the CAD image which is created on the display screen by the user. The CAD inputs are stored in vector database 18 and are also reproduced on the screen display, superimposed on top of the raster image. In this manner, the changes which the user desires to make in the raster image are shown on top of the raster image on the screen. The changes are implemented using standard CAD commands.

What appears on the screen represents a composite image with both raster and vector elements shown. The vector elements represent the CAD generated changes. Alternatively, the user may reproduce the raster image as a CAD image by simply tracing over the raster image using the proper sequence of CAD commands, thereby producing a vector-based image and eliminating the need for the raster image. The operation of resident link program 20 and transient link program 22 is shown in greater detail in FIGS. 3A–3E.

Figure 2B:
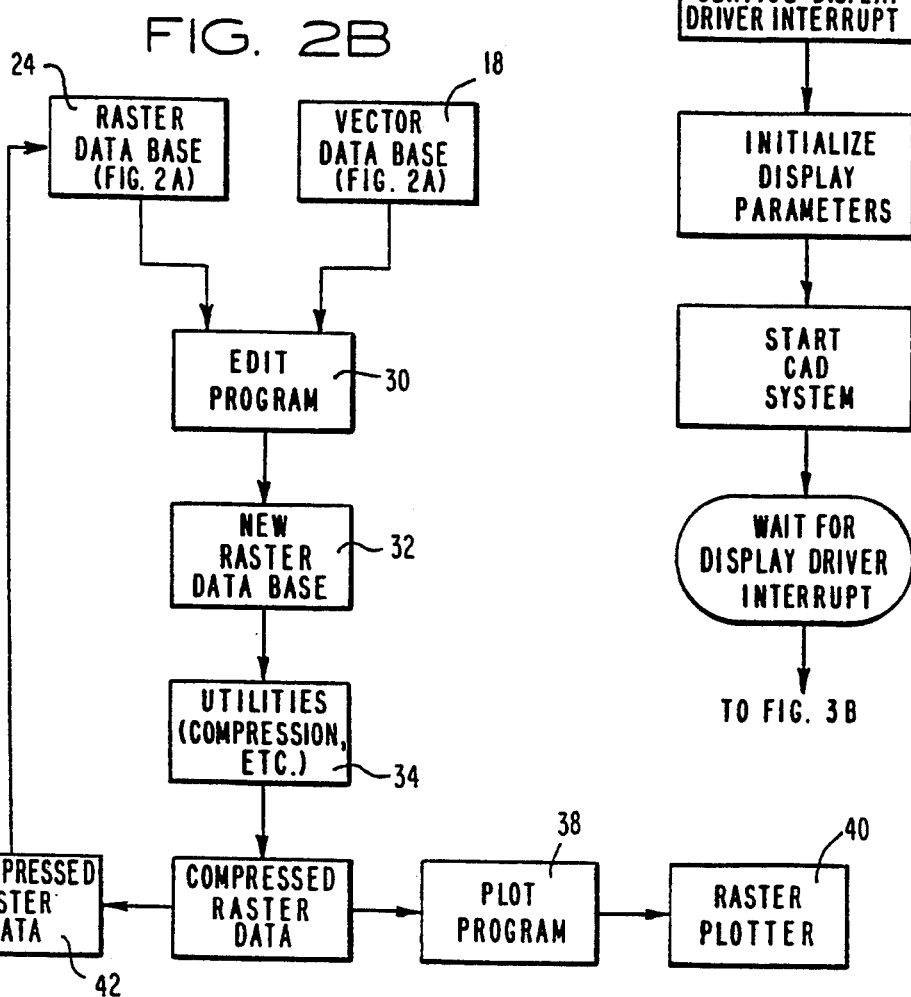

Referring to FIG. 2B, an edit program 30 is used to merge the CAD system inputs, which are stored in vector database 18, with the original raster image, which is stored in raster database 24, in accordance with another aspect of the invention. Edit program 30 will generate a new raster database 32 in which an updated raster image is stored, which represents the original raster image as edited by the CAD commands. The new raster data may be compressed using a conventional utilities program, as indicated at 34. The raster data, which may be either compressed or decompressed, is transmitted to a plot program 38, which controls a raster plotter 40. Raster plotter 40 is used to generate a hard copy of the updated raster image. The new raster data may be decompressed, as indicated at 42, and stored in raster database 24 for further processing. The operation of edit program 30 will be described in greater detail below, with reference to FIG. 5.

Figure 3A:
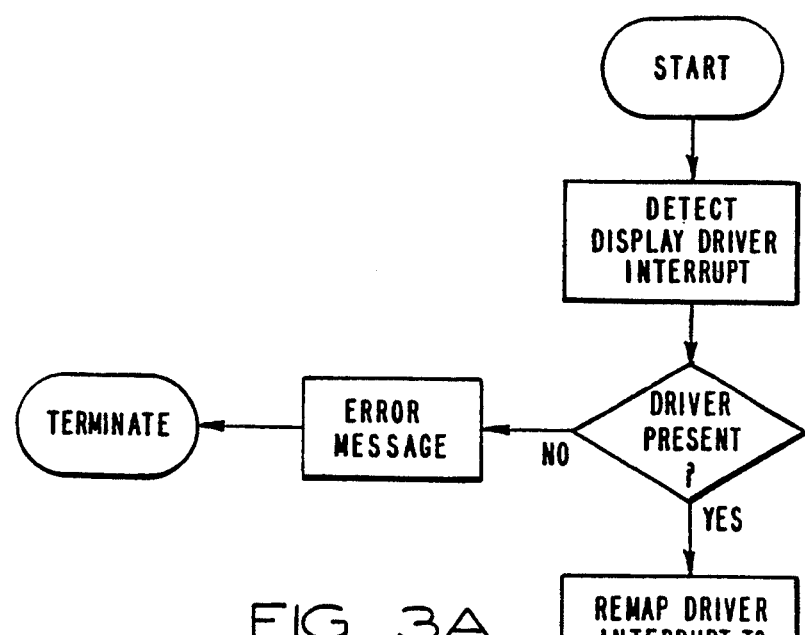
FIGS. 3A–3E are flow diagrams, illustrating the sequence of operation of the apparatus and method for manipulating scanned documents using computer aided design commands, according to the present invention.

Referring to FIG. 3A, the resident link program is initialized in a conventional DOS operating system, such as PC/DOS or MS/DOS. The DOS operating system includes an interrupt vector table, a particular location of which is dedicated to a display driver. If there is no valid display driver interrupt address present, an error message will be generated and the program operation is terminated. If a valid display driver interrupt address is present in the interrupt vector table, the resident link program will be mapped to this address and the display driver interrupt command will be remapped to a clear location in the interrupt vector table. As a result of this operation, the resident link program will assume the location in the interrupt vector table previously occupied by the display driver which is used by the CAD system to effect changes to the screen display.

Initial display parameters, such as the location of the origin of the display and the display scale and color, are transmitted by the resident link program to the display driver. The resident link program then starts the execution of the CAD system and waits for a display driver interrupt command from the CAD system.

Figure 3B:
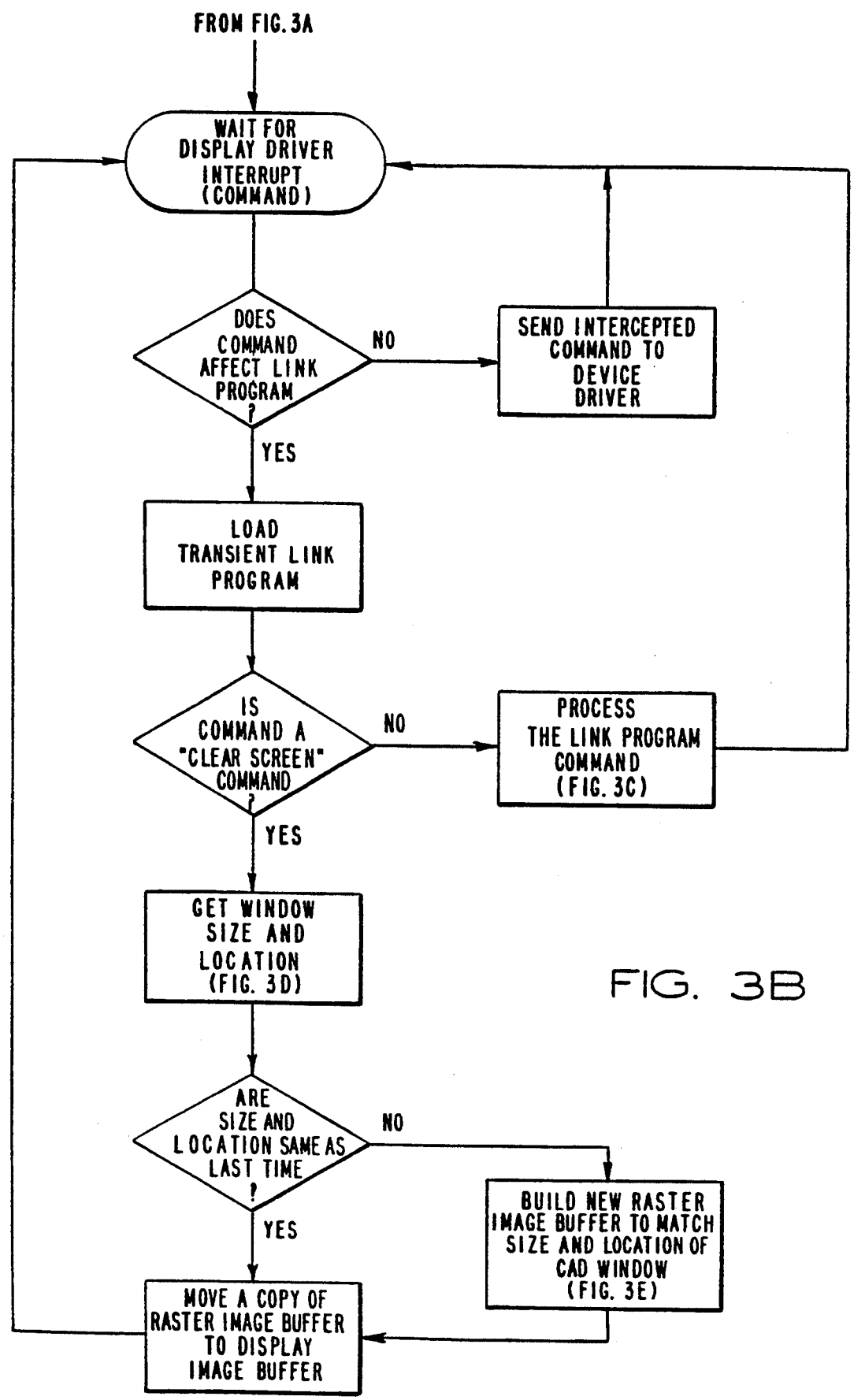

Referring to FIG. 3B, a display driver interrupt command will be generated by the CAD system when the user wants to make changes to the screen display. Because the resident link program now services the display driver interrupt, the resident link program will intercept each CAD command and determine whether what particular command affects the raster image controlled by the link program. If the command does not affect the raster image, the intercepted command is sent directly to the display driver and the resident link program will wait for a subsequent display driver interrupt command.

Figures 3C, 3D:
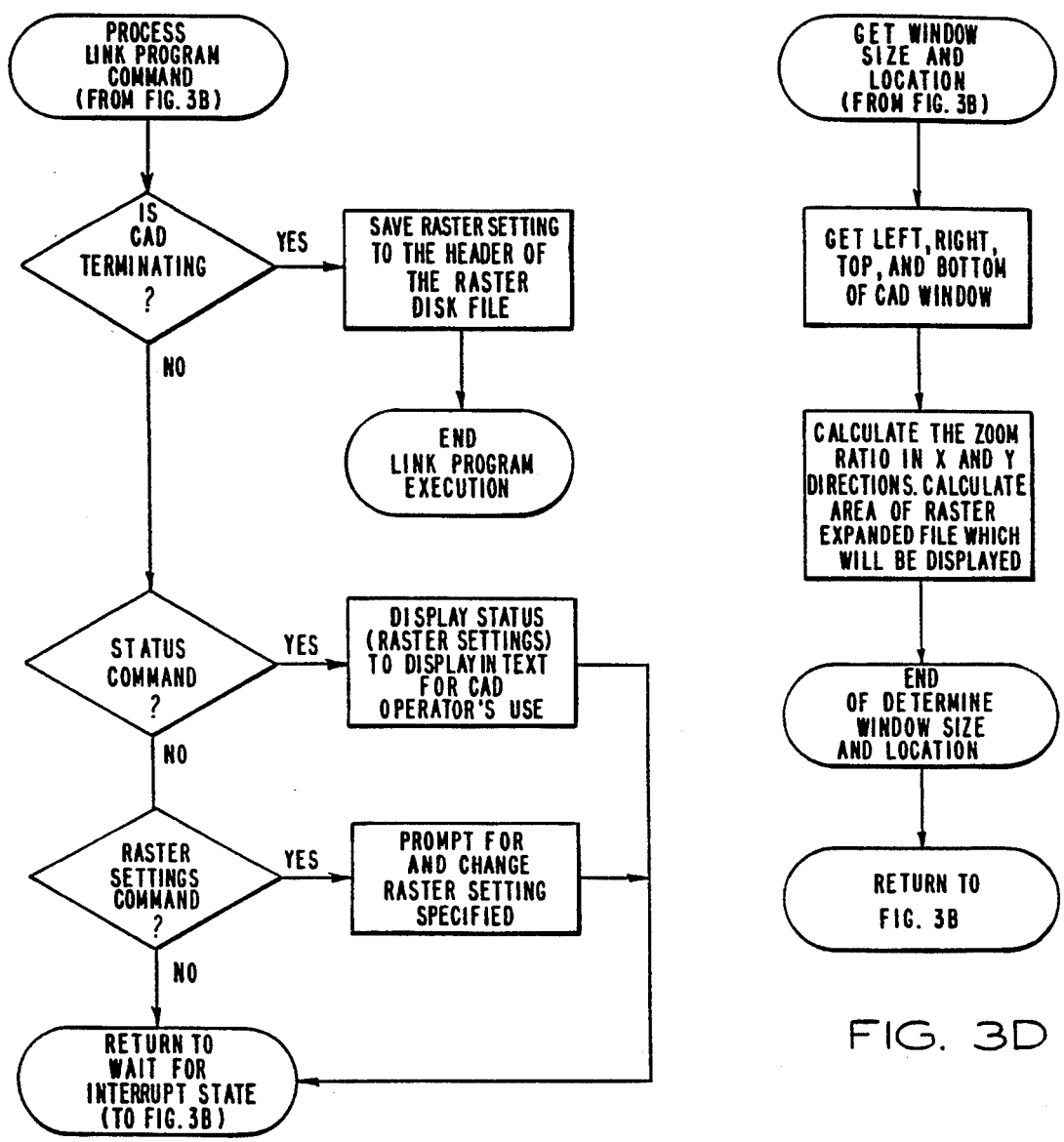
Figure 3E:
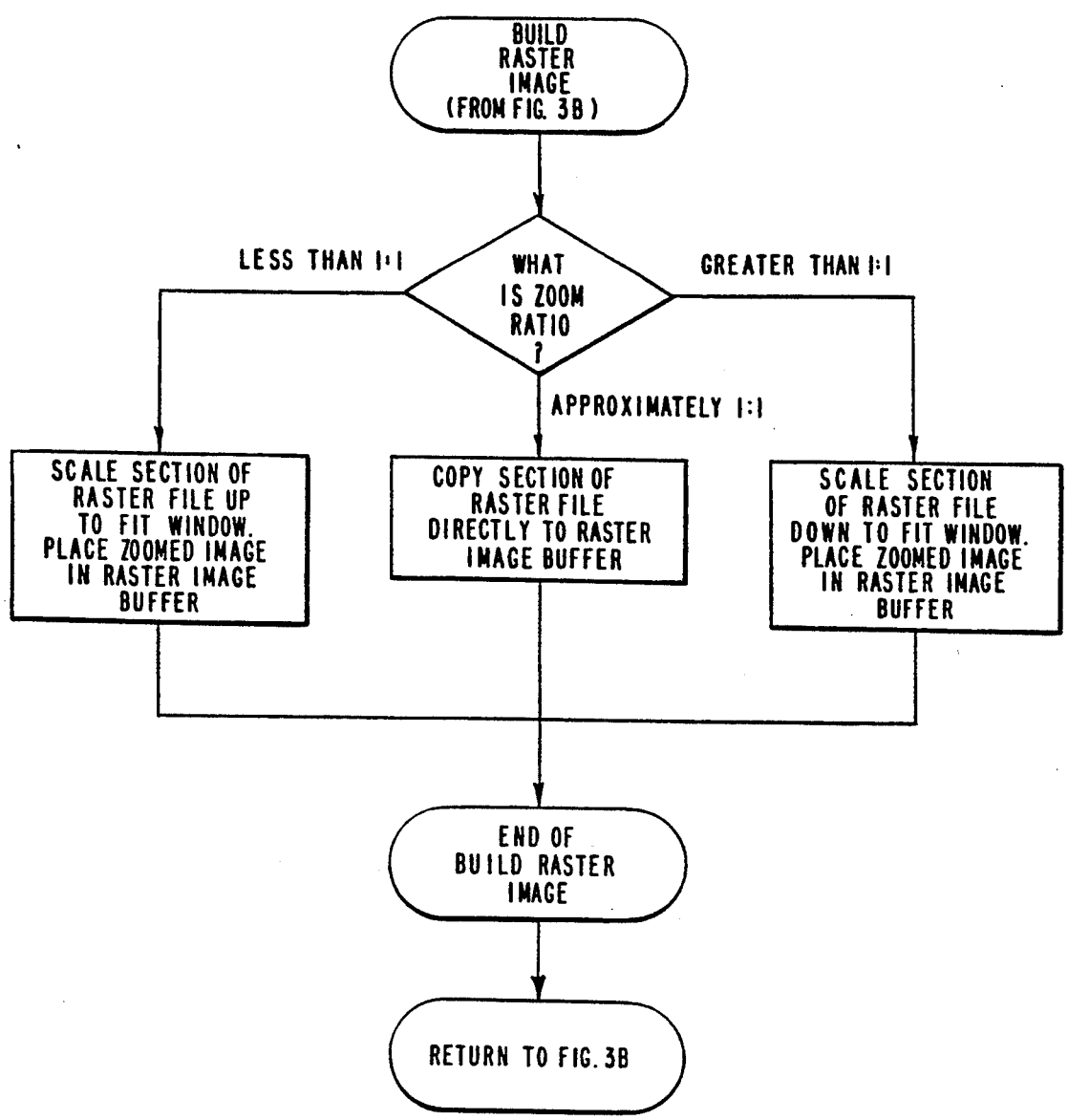

If, on the other hand, the CAD command does affect the raster image, the resident link program will load the transient link program, which will respond to the CAD command, as shown in the remainder of FIG. 3B and in FIGS. 3C–3E. If the incoming command is not a "CLEAR SCREEN" command, which clears the entire graphics display, the transient link program will process the command in accordance with the sequence of steps set forth in FIG. 3C.

Referring to FIG. 3C, if the CAD command indicates "TERMINATE", then no additional CAD commands will be forthcoming, at least for the present time. In that event the raster settings, such as the origin, scale and display color, will be saved for future processing and the link program execution will terminate. If the incoming command does not indicate that the CAD system is terminating, the transient link program will determine whether the incoming command is a "STATUS COMMAND". If a "STATUS COMMAND" is indicated, the raster settings will be displayed on the screen in text for viewing by the operator and the program will branch back to the beginning of FIG. 3B and wait for another CAD command.

If a "STATUS COMMAND" is not indicated, the program will determine whether a "RASTER SETTINGS COMMAND" is being sent. If so, one or more of the raster settings, such as the color of the foreground or background of the raster display, the raster origin and the raster (i.e., ratio of pixel dots to raster image units) will be changed in accordance with the particular "RASTER SETTINGS COMMAND". If a "RASTER SETTINGS COMMAND" is not indicated, the program will branch back to the beginning of FIG. 3B to wait for a subsequent CAD command.

Referring again to FIG. 3B, if a "CLEAR SCREEN" command is sent by the CAD system, the transient link program will determine the size and location of the CAD window by addressing the CAD system to determine the Cartesian coordinates (x, y) of two diametrically opposite corner points of the rectangular CAD window. For example, the transient link program will determine the x, y coordinates of the lower left corner point of the rectangular window and the x, y coordinates of the upper right corner point of the window. The x, y coordinates of the boundary points of the window are referenced to a predetermined CAD origin, which is established at a predetermined position on the display screen or off the display screen. The default position of both the raster origin and the CAD origin is at the lower left corner of the display screen. The coordinates are expressed in terms of "world" units (e.g., inches) relative to the origin along both the X and Y axes. The size and location of the window determines the particular portion, if any, of the image which will be displayed on the screen.

As illustrated in FIG. 3D, once the boundaries of the window are determined, the zoom ratios along both the X and Y axes are computed to determine the area of the raster expanded file which will be displayed. The zoom ratio along the X axis is the ratio of a first quantity, which represents the number of screen pixels along the horizontal (X) axis of the display divided by the distance in "world" units (e.g., inches) between the right and left boundaries of the window, to a second quantity, which represents the number of raster pixels per unit (i.e., the raster scale). Similarly, the zoom ratio along the Y axis is the ratio of a first quantity, which represents the number of screen pixels along the vertical (Y) axis of the display divided by the distance in "world" units between the top and bottom boundaries of the window, to a second quantity, which represents the raster scale.

Typically, the number of screen pixels along a particular axis and the raster scale are constant. Therefore, the corresponding zoom ratio will vary as the extent of the window varies along a particular axis. The raster expanded file is stored in the raster database and represents the entire raster image. Each pixel comprising the raster image is assigned discrete x, y coordinates in "world" units so that all pixels falling within the window boundaries will be displayed. In this manner, the raster image is always maintained in registration with the CAD image.

The portion of the raster image to be displayed is moved from a raster image buffer to a display image buffer, if the size and location of the window are unchanged. If the size and/or location of the window are changed, the raster image buffer must be changed to match the size and location of the new CAD window in accordance with the procedure set forth in FIG. 3E.

Referring to FIG. 3E, the zoom ratios are used to scale the section of the raster image being displayed either up or down to fit the display window. For example, if the zoom ratio along a particular axis is approximately 1:1, the section of the raster file to be displayed is copied directly to the raster image buffer. If the zoom ratio is less than 1:1, the number of screen pixels per unit is less than the number of raster pixels per unit and the section of the raster image to be displayed must be scaled up to fit the boundaries of the window, and the zoomed image is placed into the raster image buffer. If the zoom ratio is greater than 1:1, the number of screen pixels per unit is greater than the number of raster pixels per unit and the section of the raster image to be displayed is scaled down to fit the window and the zoomed image is placed in the raster image buffer.

With the raster image, or a selected portion thereof, displayed on the screen, the operator has a reference image which he can use to implement changes and/or additions to the raster image or trace directly over the raster image to produce a substantially identical CAD image. One skilled in the art will appreciate that being able to superimpose a CAD image directly over the raster image with standard CAD commands facilitates the production of a desired drawing design.

Figure 4A:
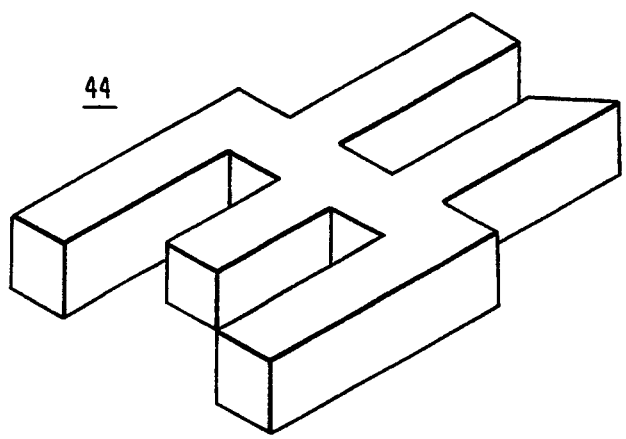
FIGS. 4A–4D are respective perspective views illustrating changes made to a scanned drawing using computer aided design commands and the resulting raster image with the computer aided design changes implemented therein, according to the present invention.
Figure 4B:
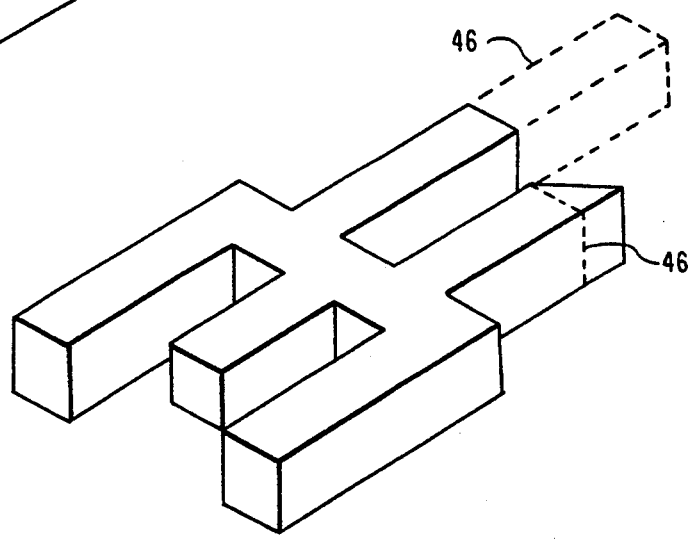

FIG. 4A illustrates a raster-based image 44, which may appear on a sheet of paper or other hard copy. The document can be scanned to load the raster image into the raster database, as previously described. FIG. 4B illustrates changes made in the raster image directly on screen using CAD commands. The dashed lines, as indicated at 46, represent the changes in the image made by the operator using the CAD system. The CAD image typically appears in at least two colors. One color is the same as the background color of the raster image so that when portions of the raster image displayed in the foreground color are overlaid by the CAD image in the background color, those portions of the raster image will visually appear to have been erased from the screen. The other color is different from the background color and is used to effect additions to the raster image at the positions where this other color overlays the portions of the raster image displayed in the background color. The raster image is always maintained in registration with the CAD image so that the CAD changes will appear at the proper positions on the original raster image.

Figure 4C:
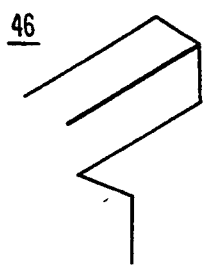
Figure 4D:
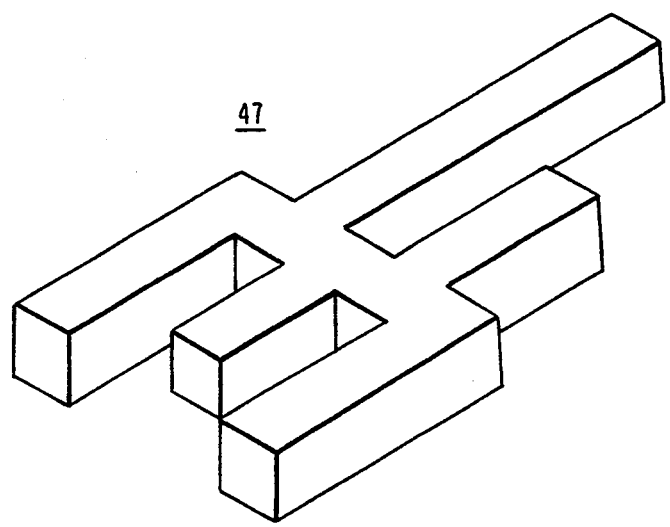

As shown in FIG. 4C, the raster image can be removed from the screen so that only the CAD generated image appears. The image 47 shown in FIG. 4C represents the image stored in the vector database associated with the CAD system and also corresponds to the dashed lines in FIG. 4B. The edit program, described below, merges the CAD generated changes with the original raster image to create a new, updated raster image, as shown in FIG. 4D. The updated raster image can then be reproduced in hard copy form with a raster plotter or the like, as previously described. Alternatively, the operator can create a CAD image, which is a duplicate of the raster image by tracing over the portion of the raster image which appears in the foreground color using a color other than the background color of the raster image.

Figure 5:
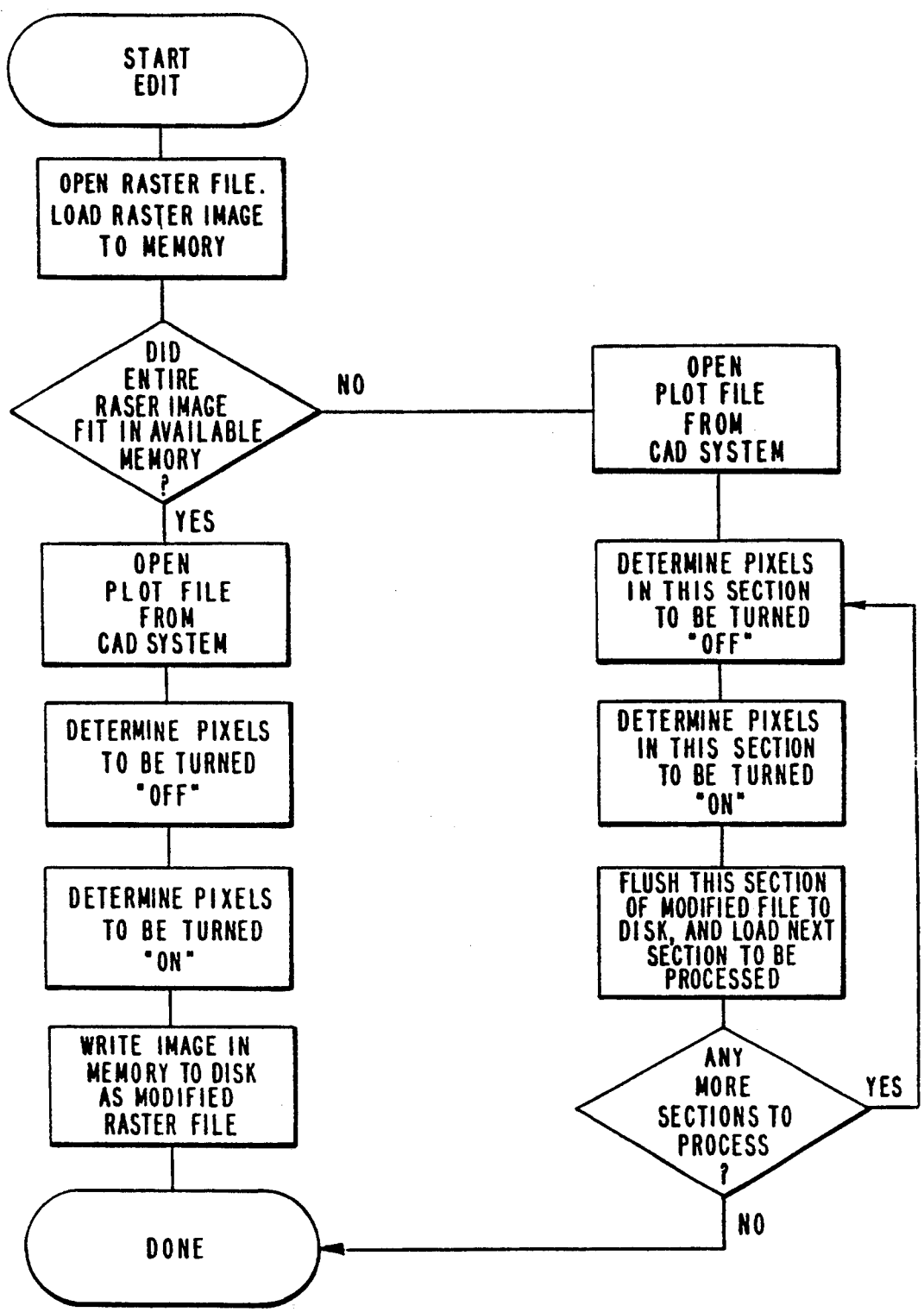
FIG. 5 is a flow diagram illustrating the operation by which the raster image is edited to include the computer aided design changes.

Referring to FIG. 5, the edit program will create a raster file in memory in which the raster image is stored. If the entire raster image cannot fit within the available memory space, the raster image will be examined in individual sections. A plot file is also established, which contains the CAD generated changes to the raster image. The vectors representing the CAD image are converted to bit-map pixels or raster pixels in the plot file.

Each of the raster file pixels and the plot file pixels has defined coordinates relative to the predetermined origin. The edit program will examine all of the raster pixels to determine which pixels need to be turned "on" or "off". If a particular raster pixel is overlaid by CAD system vectors which are drawn in the CAD system using a specific color (pen number) which matches the background color of the raster image, that particular pixel will be "erased" (i.e., turned "off"), as will all such other raster pixels overlaid by a CAD vector drawn in the background color of the raster image. Similarly, all raster pixels in the "off" state which are overlaid by CAD system vectors drawn in a color other than the background color of the raster image will be turned "on". The remainder of the raster image which is not overlaid by any portion of the CAD image will remain unchanged. After these changes are effected, the new, updated raster image, which incorporates the CAD changes, will be stored for future use. Alternatively, CAD functions other than color (pen number) that are associated with the vectors, such as layer or level, can be used to indicate that portions of the raster are to be erased or added to, as the case may be.

Figure 6A:
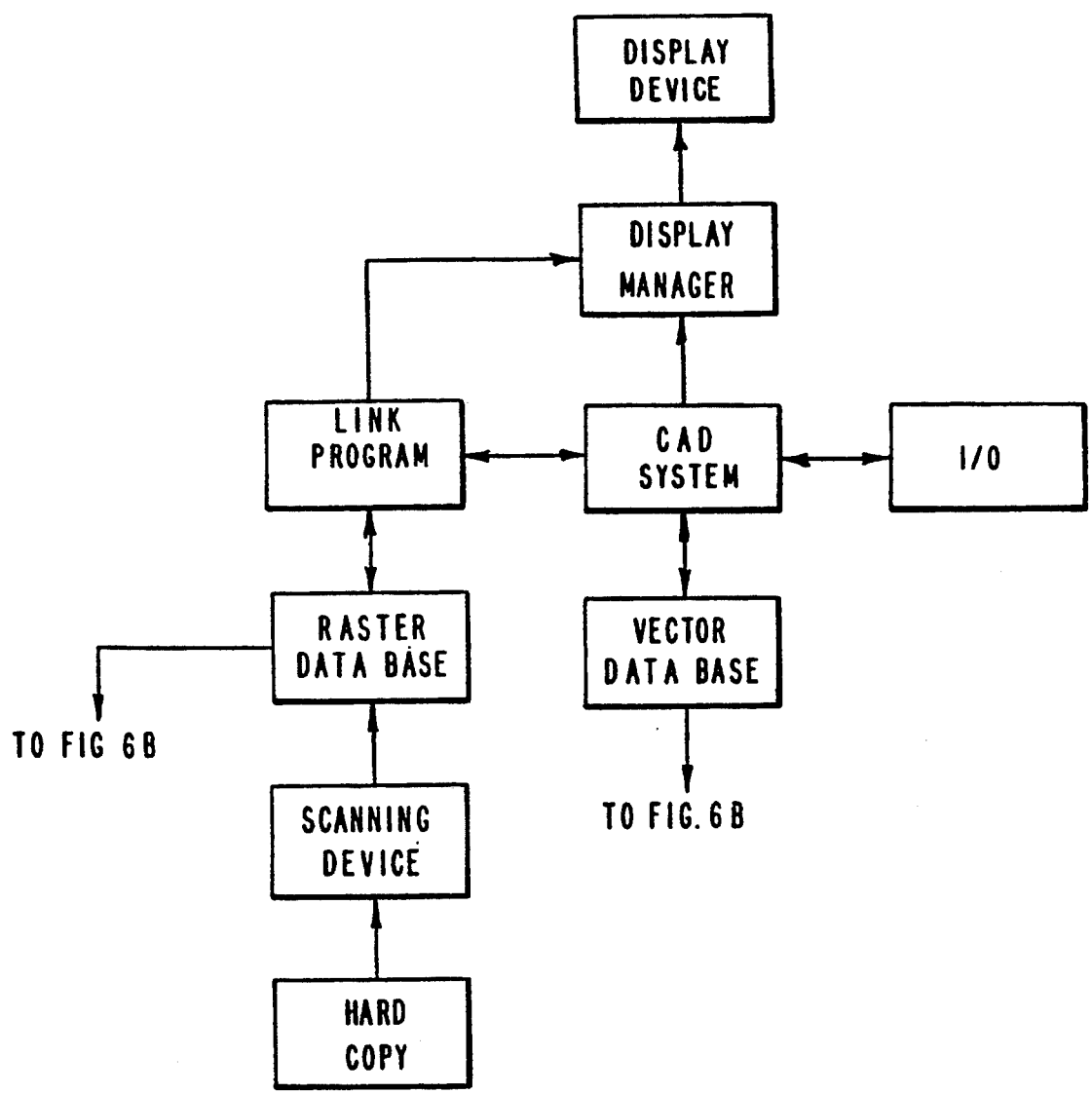
FIGS. 6A and 6B are block diagrams of an alternate embodiment of the apparatus and method for manipulating scanned documents using computer aided design commands, according to the present invention.
Figure 6B:
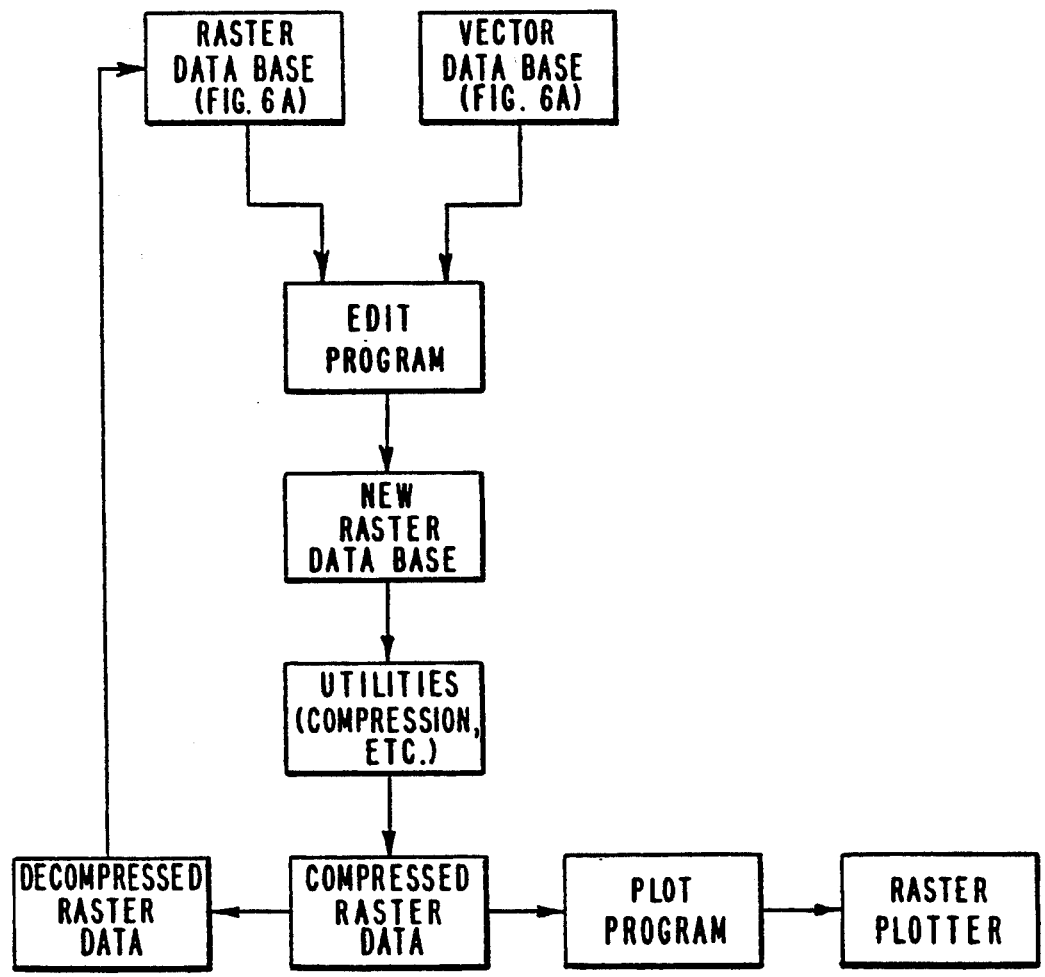

Referring to FIGS. 6A and 6B, an alternate embodiment of the system and method for manipulating scanned documents using computer aided design commands, according to the present invention, is illustrated. The system is substantially the same as the system illustrated in FIGS. 2A and 2B, except that link program 48 is not interposed between CAD system 50 and the display driver as is the case in the system illustrated in FIG. 2A. Instead, link program 48, which includes both the resident and transient portions of the program, communicates via an interprocess communication path (e.g., pipe) with CAD system 50.

CAD system 50 sends all commands affecting link program 48 directly thereto, rather than having the link program intercept the commands from the CAD system, as in the system illustrated in FIG. 2A. The arrangement shown in FIGS. 6A and 6B is typically implemented in connection with a UNIX-based operating system, whereas the system illustrated in FIGS. 2A and 2B is typically implemented in a DOS-based operating system. Also, a display manager 52, which is a sophisticated version of a display driver, is used in the UNIX-based system to control display device 54.

One skilled in the art will appreciate that a raster image will provide better resolution than a vector-based image, particularly when the image is zoomed in to display small portions thereof. Furthermore, by maintaining the raster image in the background in registration with the CAD image, the operator can quickly and accurately produce a CAD image which duplicates the raster image by simply tracing over the raster image or, alternatively, make changes to the raster image using CAD commands. As a result, the system and method according to the present invention allow an operator to manipulate raster-based, scanned documents using standard computer aided design commands, which substantially reduces the time and expense associated with the production of design drawings and other graphic displays, both on screen and in hard copy form.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. In an electronic data processing system, apparatus for manipulating a scanned document, comprising, in combination:

first means for electronically displaying a first image representing the scanned document, said first image being a raster image comprised of a plurality of discrete picture elements defining at least one graphic element having a first shape;

second means for electronically displaying in response to user input commands, simultaneously with the display of said raster first image, a second image, said second image being a vector-based image comprised of a plurality of vectors having respective defined starting and ending points having predetermined positions relative to said picture elements of said raster first image and representing user-generated alterations to the first shape of said at least one graphic element; and merging means for merging said first and second images to provide an edited raster image wherein said at least one graphic element has a second shape differing from said first shape in accordance with at least one of said plurality of vectors displayed responsive to the user input commands.

2. Apparatus according to claim 1 further including means for producing a hard copy of the edited raster first image.

3. Apparatus according to claim 1 further including manipulating means, responsive to a user input command indicating that only a selected portion of the scanned document is to be displayed, for manipulating said raster first image to display only a portion of the scanned document.

4. Apparatus according to claim 3 wherein each of said picture elements of said raster first image is in either an on state or an off state, said first means comprising first color means for displaying each element which is in an on state in a first color associated therewith and for displaying each element which is in an off state in a second color associated therewith, which is different from the first color.

5. Apparatus according to claim 4 wherein said manipulating means comprises means for determining a location and boundaries of a rectangular window representing the selected portion of the scanned document which is to be displayed, means for identifying the picture elements of the raster first image which fall within the boundaries of the display window and means for adjusting a scale of the raster first image, if necessary, to conform to the display window.

6. Apparatus according to claim 4 wherein said second means includes second color means for displaying each of said plurality of vectors of said vector-based second image in a predetermined color associated therewith.

7. Apparatus according to claim 6 wherein said merging means comprises:

first identifying means for identifying a first set of picture elements in the on state which are overlaid by corresponding vectors of the vector-based image having the second color associated therewith and for changing said first set of picture elements from the on state to the off state;

second identifying means for identifying a second set of picture elements in the off state which are overlaid by corresponding vectors of the vector-based second image having a color other than the second color associated therewith and for changing said second set of picture elements from the off state to the on state; and means for generating an edited raster image according to the changes in said first and second sets of picture elements.

8. Apparatus according to claim 1, wherein said second means comprises a computer aided design system (CAD), and said merging means comprises:

editing means responsive to CAD user input commands of said second image for modifying said first image in accordance therewith.

9. Apparatus according to claim 8, further comprising a raster data base for storing raster data representing said first image, said editing means responding to said CAD user input commands by accessing and editing raster data in said raster data base.

10. Apparatus according to claim 9 further comprising means for driving a display in accordance with raster data from said raster data base.

11. Apparatus according to claim 9, wherein said editing means comprises means for modifying said raster data base by storing therein edited raster data.

12. Apparatus according to claim 8, wherein said electronic data processing system includes an operating system having an interrupt vector table, further comprising:
  driver identification means for identification of existence of a display driver interrupt address in the vector table,
  relocation means for relocating a CAD generated display driver interrupt from said display driver interrupt address to a clear location, and
  remapping means for remapping a link program means to said display driver interrupt address.

13. Apparatus according to claim 1, further including manipulating means responsive to user input CAD commands for simultaneously manipulating a hybrid image including both said first, raster, image and said second, vector-based, image.

14. In an electronic data processing system, a method of manipulating a scanned document, comprising the steps of:
  electronically displaying a first image representing the scanned document, said first image being a raster image comprised of a plurality of discrete picture elements defining at least one graphic element having a first shape;
  electronically displaying in response to user input commands, simultaneously with the display of said raster first image, a second image, said second image being a vector-based image comprised of a plurality of vectors having respective defined starting and ending points having predetermined positions relative to said picture elements and representing user-generated alterations to the first shape of said at least one graphic elements; and
  merging said first and second images to provide an edited raster image wherein said at least one graphic element has a second shape differing from said first shape by at least one of said plurality of vectors displayed responsive to the user input commands.

15. The method according to claim 14 further including the step of responding to a user input command indicating that only a selected portion of the scanned document is to be displayed by manipulating the raster first image so that only the selected portion of the document is displayed.

16. The method according to claim 14 wherein each of said plurality of picture elements of said raster first image is in either an on or an off state,
  said step of electronically displaying said raster first image including the further steps of displaying each element which is in an on state in a first color associated therewith and displaying each element which is in an off state in a second color associated therewith, said second color being different from the first color.

17. The method according to claim 16 wherein the step of manipulating the raster first image to display only the selected portion of the scanned document comprises the following sub-steps:
  determining a location and boundaries of a substantially rectangular window representing the selected portion of the scanned document which is to be displayed;
  identifying the picture elements of the raster first image which fall within the boundaries of the display window to determine the portion of the raster first image which is to be displayed; and
  adjusting a scale of the portion of the raster first image which is to be displayed, if necessary, to conform to the display window.

18. The method according to claim 16 wherein said step of electronically displaying said vector-based second image comprises the step of displaying each of the vectors of said vector-based second image in a predetermined color associated therewith.

19. The method according to claim 18 wherein the step of merging the raster first image and the vector-based second image comprises the following sub-steps:
  identifying a first set of picture elements in the on state which are overlaid by corresponding vectors of the vector-based second image having the second color associated therewith and changing said first set of picture elements from the on state to the off state;
  identifying a second set of picture elements in the off state which are overlaid by corresponding vectors having a color other than the second color associated therewith and changing said second set of picture elements from the off state to the on state; and
  generating an edited raster image in accordance with the changes in said first and second sets of picture elements.

20. In an electronic data processing system which is responsive to user input commands, apparatus for manipulating a scanned document, comprising:
  first means for generating a first digital coded image of the scanned document, said first digital coded image being a raster image comprised of a plurality of discrete picture elements each of which has a defined position relative to a predetermined reference position for defining at least one graphic element having a first shape;
  display means for electronically displaying the raster image;
  second means for generating a second digital coded image in response to the user input commands simultaneous with the display of said raster image, said second digital coded image being a vector-based image comprised of a plurality of vectors having respective defined starting and ending points relative to the predetermined reference position such that said vectors register with predetermined locations in said raster image and define alterations to the first shape of said at least one graphic element; and
  merging means for electronically merging said raster and vector-based images to provide an edited raster image wherein said at least one graphic element has a second shape differing from said first shape in accordance with at least one of said plurality of vectors displayed responsive to the user input commands.

21. Apparatus according to claim 20 further including manipulating means, responsive to a user input command indicating that only a selected portion of the scanned document is to be displayed, for manipulating the raster image to display only the selected portion of the scanned document.

22. Apparatus according to claim 21 wherein said manipulating means comprises:
   means for determining location and boundaries of a rectangular window representing the selected portion of the scanned document which is to be displayed;
   means for identifying particular ones of the picture elements which fall within the boundaries of the display window; and
   means for adjusting a scale of the raster image to conform to the display window.

23. Apparatus according to claim 20 wherein each of said picture elements of said raster image is in either an on state or an off state, further comprising:
   means for associating a first color with each picture element which is in an on state and for associating a second color with each picture element which is in an off state, said second color being different from the first color.

24. Apparatus according to claim 23, further comprising means for associating a respective predetermined color with wherein each of said vectors.

25. Apparatus according to claim 23 wherein said second means operates to generate said vector-based image to include a plurality of vectors representing a predetermined shape at a particular position with respect to the predetermined reference position.

26. Apparatus for manipulating a scanned document in a computer aided design system responsive to user input commands, comprising:
   first means for electronically displaying a first image representing the scanned document, said first image representing at least one graphic element having a first shape, said first image being displayed in foreground and background colors, said background color being different from said foreground color; and
   second means for electronically displaying a second image simultaneously with the display of said first image, said second image being generated in response to user input commands and representing alterations to the first shape of said at least one graphic element, said second means displaying said second image such that said second image registers with predetermined locations of said first image and overlays at least a portion of said first image, and such that said second image is displayed in at least two colors, one of which is said background color,
   said first and second means operating in cooperation to effect a visual erasure of a first portion of said graphic element of said first image when said first portion of said first image is displayed in said foreground color and is overlaid by a portion of said second image in said background color, and
   said first and second means operating in cooperation to effect a visual addition to a second portion of said first graphic element of said first image displayed in said background color where a portion of said second image having the other of said at least two colors overlays the second portion of said first image displayed in said background color.

27. Apparatus according to claim 26 wherein said first image is a raster image comprised of a plurality of picture elements, each of which is either in an on or an off state, said first means displaying each element which is in an on state in said first color and displaying each element which in an off state in said second color, each of said picture elements having a defined position with respect to a predetermined reference position, said second image being a vector-based image comprised of a plurality of vectors, said second means displaying each of said vectors in a predetermined color, and including
   identifying means for identifying a first set of picture elements comprising said first portion of said first image and for changing said first set of picture elements from an on state to an off state and means for identifying a second set of picture elements comprising said second portion of said first image and for changing the second set of picture elements from an off state to an on state.

28. Apparatus according to claim 27 wherein said other of said two colors of said second image represents the foreground color of the raster image.

29. Apparatus according to claim 26 further including means for storing in the system the edited first image having the altered first shape and for generating a hard copy of the edited first image.

30. Apparatus for manipulating a scanned document in a computer aided design system which uses computer aided design user input commands for producing a design drawing on a computer screen display, said apparatus comprising:
   means for determining the location and boundaries of a rectangular window representing a selected portion of the scanned document which is to be displayed;
   means for identifying picture elements of a first image representing at least a portion of the scanned document which fall within the boundaries of said window;
   means for adjusting a scale of said first, image, as necessary, to conform to said window;
   first means for electronically displaying said first image as a raster image including a plurality of discrete picture elements defining at least one geometric object having a first shape and for displaying said first image in foreground and background colors, said foreground color being different from said background color;
   second means for electronically displaying a second image simultaneous with the display of said first image, said second means generating said second image in response to user input commands and representing alterations tied the shade of said first shape of said at least one geometric object,
   said second means displaying said second image in registration with predetermined locations of said first image, and to overlay at least a portion of said first image, said second means displaying said second image in at least two colors, one of which is said background color,
   said first and second means operating in cooperation so that when first portions of said first image displayed in said foreground color are overlaid by portions of said second image displayed in said background color, said first portions visually appear to have been erased, and so that at positions where portions of said second image displayed in the other color of said at least two colors of said second image overlay second portions of said first image displayed in said background color additions are provided to said second portions, thus altering said first shape to provide a second shape for said at least one graphic element; and means for merging said first image and said second image to provide a resulting edited raster image incorporating said second shape of said at least one graphic element of said second image.

31. Apparatus according to claim 30, wherein said means for merging comprises:

editing means responsive to CAD user input commands of said second image for modifying said first image in accordance therewith.

32. Apparatus according to claim 31, further comprising a raster data base for storing raster data representing said first image, said editing means responding to said CAD user input commands by accessing and editing raster data in said raster data base.

33. Apparatus according to claim 32 further comprising means for driving the computer screen display in accordance with raster data from said raster data base.

34. Apparatus according to claim 32, wherein said editing means comprises means for modifying said raster data base by storing therein edited raster data.

35. Apparatus according to claim 31, wherein said CAD system includes an operating system having an interrupt vector table, further comprising:

driver identification means for identification of existence of a display driver interrupt address in the vector table, relocation means for relocating a CAD generated display driver interrupt from said display driver interrupt address to a clear location, and remapping means for remapping a link program means to said display driver interrupt address.

36. Apparatus according to claim 35, further comprising intercepting means for intercepting a display driver interrupt generated by said CAD system in response to a user input command, and service means for servicing said interrupt by accessing and editing raster data in a raster data base and by driving the computer screen display in accordance with the edited data from raster data base.

37. In a computer aided design (CAD) system utilizing computer aided design user input commands to produce and modify a vector-based image, the improvement comprising:

raster data base means for storing raster data representing a plurality of discrete picture elements defining at least one geometric object having a first shape, and edit program means, responsive to vector-based CAD user input commands to generate or modify said vector-based image, for modifying said raster data representing said plurality of discrete picture elements in accordance with said vector-based CAD user input commands.

38. Apparatus according to claim 37 further comprising means for storing data modified by said edit program means in said raster data base.

39. Apparatus according to claim 38 further comprising display driving means for driving a display in accordance with said data modified by said editing means.

40. Apparatus according to claim 39 wherein said display driving means comprises means for displaying a raster image including picture elements representing only the raster data as modified by said edit program means in accordance with said vector-based CAD user input commands.

41. Apparatus according to claim 39 wherein said display driving means comprises means for displaying a composite image and causing said composite image to include both picture elements representing raster data and vector elements representing vector-based data.

42. Apparatus according to claim 37 wherein said edit program means comprises means comprises:

driver identification means for identification of existence of a display driver driven by the CAD system, relocation means for relocating a display driver identified by said driver identification means from a driver address to a clear location therefor, and remapping means for remapping the edit program means to said driver address.

* * * * *